L. B. WATERMAN.
Wheel Cultivator.
No. 35,282.
Patented May 13, 1862.
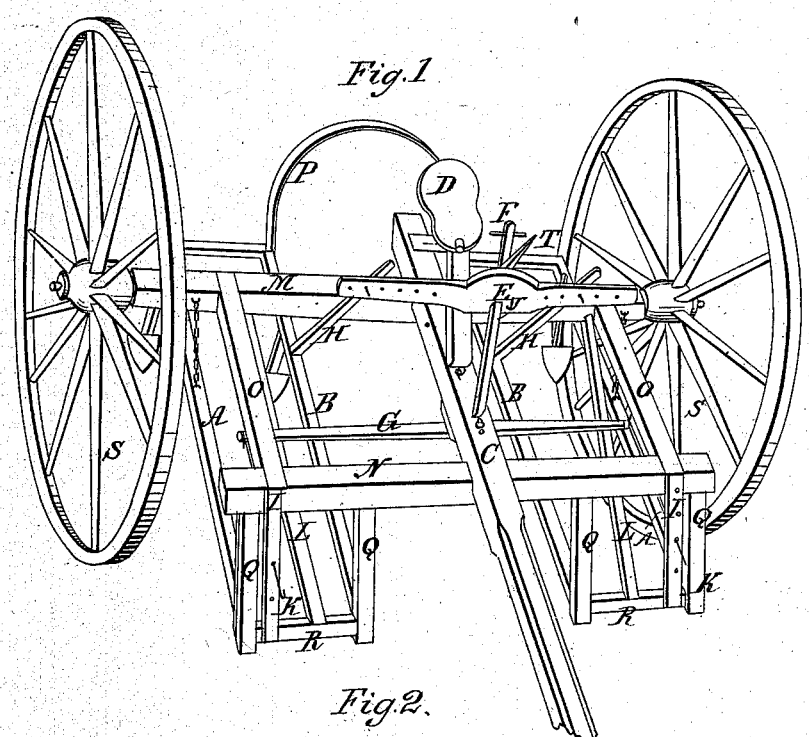
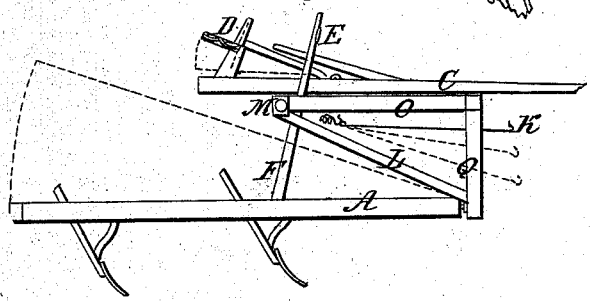
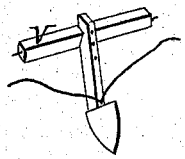
Witnesses.
F. W. Tunstellotts
E. L. Brown
Inventor.
L. B. Waterman

UNITED STATES PATENT OFFICE.

L. B. WATERMAN, OF CHICAGO, ILLINOIS, ASSIGNOR TO HIMSELF AND JAMES S. BANGS, OF SAME PLACE.

IMPROVEMENT IN CULTIVATORS.

Specification forming part of Letters Patent No. 35,282, dated May 13, 1862.

*To all whom it may concern:*

Be it known that I, LAWRENCE B. WATERMAN, of the city of Chicago, in the county of Cook and State of Illinois, have invented a new Improvement in Two-Horse Cultivators; and I do hereby declare that the following is a clear and exact description thereof, reference being had to the accompanying drawings, and to the letters of reference marked thereon, in which—

Figure 1 is a perspective view. Fig. 2 is a side and sectional view. Fig. 3 is a sectional part of the same.

The object of this invention is to obtain a cultivator which, first, shall be cheap and simple in its construction, and, secondly, one that will require but little labor to attend its operation in all kinds of work. The purpose of the said machine is to cultivate corn, cotton, potatoes, and, in fact, all plants that are grown in hills or drills, and is also designed, by attaching additional plows, to plow in wheat and other small grain, and to act as a cultivator generally for preparing grounds for all kinds of crops. Fig. 3 is a view of one of the plows to be added for cultivation generally, as above described. The machine is drawn by two horses, one each side the row being cultivated, and may be operated by either a man or a boy, as the case may require, as but little strength is requisite to manage it.

I am aware that similar machines have been built and used for the purposes alluded to above and a partial success attained; but I believe all have been more or less objectionable, from the fact of their complication and extreme cost.

Having thus set forth the object of my invention and its purposes, I will proceed to describe its construction.

My frame-work M N O C Q R L is made of suitable-sized timber, framed and bolted substantially together, to combine sufficient strength for the machine. I then proceed to attach my beams A A and B B by means of a hinge, as seen in the drawings, the same being held together by means of a bow, P, which is made of common wagon-tire iron.

It will be seen that there are in the hind end of my beams B B gudgeons attached, which allow them to roll.

I have discovered from actual experiment that weight is requisite upon the cultivators to cause them at all times to run a sufficient depth into the ground. For this purpose I have supplied an adjustable seat, D, which is so constructed as to allow a man's or boy's feet to rest upon the frame or beams below by simply elevating or depressing said seat D, thereby giving the desired weight to allow the plows to run a uniform depth, which I consider of utmost importance, which is successfully accomplished by this arrangement.

I will now proceed to describe the manner in which I obtain my draft.

The double-tree G is bolted to the under side of the tongue C a suitable distance from the axle M. Attached to the same are draft-rods K K, passing through a graduating bar, I, and it will be seen that any downward or upward tendency of the tongue C upon the horses' necks is overcome when the rods are properly adjusted.

I believe I have now described the principal features of this machine, many parts of which I am aware are not new. Therefore I do not claim hinging cultivator-beams to an axle or frame-work. Neither do I claim the rolling motion given to inside beams, B B; but What I do claim, and desire to secure by Letters Patent, is—

The arrangement of the adjustable seat D, in combination with double-tree G, draft-rods K K, and graduating-bar I, when operated and attached to the frame-work for the uses and purposes described, as substantially set forth.

L. B. WATERMAN.

Witnesses:
F. W. TOURTELLOTTE,
E. R. BROWN.